United States Patent
Osakabe et al.

(10) Patent No.: US 8,778,528 B2
(45) Date of Patent: Jul. 15, 2014

(54) ELECTRICITY STORAGE DEVICE

(75) Inventors: Tomotaka Osakabe, Toyota (JP); Mikio Wakasugi, Toyota (JP); Masahiro Imai, Toyota (JP); Ryogo Murayama, Toyota (JP)

(73) Assignees: Toyota Jidosha Kabushiki Kaisha, Toyota-Shi (JP); Kojima Press Industry Co., Ltd., Toyota-Shi (JP)

( * ) Notice: Subject to any disclaimer, the term of this patent is extended or adjusted under 35 U.S.C. 154(b) by 0 days.

(21) Appl. No.: 13/818,946

(22) PCT Filed: Aug. 30, 2011

(86) PCT No.: PCT/IB2011/001996
§ 371 (c)(1),
(2), (4) Date: Feb. 25, 2013

(87) PCT Pub. No.: WO2012/028932
PCT Pub. Date: Mar. 8, 2012

(65) Prior Publication Data
US 2013/0157103 A1  Jun. 20, 2013

(30) Foreign Application Priority Data
Aug. 31, 2010  (JP) ................. 2010-194530

(51) Int. Cl.
*H01M 2/02* (2006.01)
*H01M 2/18* (2006.01)
*H01M 8/24* (2006.01)

(52) U.S. Cl.
USPC ........... 429/177; 429/467; 429/469; 429/146; 429/151; 429/153; 429/172

(58) Field of Classification Search
None
See application file for complete search history.

(56) References Cited

U.S. PATENT DOCUMENTS

| | | | |
|---|---|---|---|
| 6,200,698 B1 * | 3/2001 | Carlstrom, Jr. | 429/465 |
| 6,258,475 B1 * | 7/2001 | Sugita et al. | 429/470 |
| 2006/0204840 A1 * | 9/2006 | Jeon et al. | 429/152 |
| 2007/0026305 A1 * | 2/2007 | Jeon et al. | 429/159 |
| 2008/0113250 A1 * | 5/2008 | Joos et al. | 429/35 |
| 2010/0136461 A1 * | 6/2010 | Tsujiko et al. | 429/512 |

FOREIGN PATENT DOCUMENTS

| | | |
|---|---|---|
| EP | 2317468 A1 | 5/2011 |
| JP | 2002-203527 A | 7/2002 |
| JP | 2006-253149 A | 9/2006 |
| JP | 2007-115718 A | 5/2007 |
| JP | 2008-277085 A | 11/2008 |
| JP | 2009-238644 A | 10/2009 |
| JP | 2010-086843 A | 4/2010 |

* cited by examiner

Primary Examiner — Cynthia K. Walls
(74) Attorney, Agent, or Firm — Kenyon & Kenyon LLP

(57) ABSTRACT

An electricity storage device includes: a plurality of cells that are aligned in a predetermined direction; a pair of end plates that sandwich the plurality of cells in the predetermined direction; and a restraining member that extends in the predetermined direction, is fixed to the pair of end plates, and exerts a restraining force on the plurality of cells in the predetermined direction via the end plates. Each of the end plates includes a first plate and a second plate. The first plate has a plurality of ribs on a surface that faces the adjacent cell and is formed of insulating material. The second plate is fixed to the first plate on a side opposite to the surface that faces the adjacent cell and is formed of material stronger than the insulating material for the first plate.

6 Claims, 4 Drawing Sheets

ELECTRICITY STORAGE DEVICE

CROSS-REFERENCE TO RELATED APPLICATIONS

This application is a U.S. National Stage patent application filed under 35 U.S.C. §371, based on International Application Serial No. PCT/IB2011/001996, which was filed on Aug. 30, 2011, which claims priority to Japanese Patent Application No. 2010-194530, filed on Aug. 31, 2010, the entire contents of each of which are expressly incorporated herein by reference.

BACKGROUND OF THE INVENTION

1. Field of the Invention

The invention relates to an electricity storage device that exerts a restraining force on a plurality of cells with the use of end plates.

2. Description of Related Art

In some cases, a plurality of unit cells are aligned in a direction when the plurality of unit cells are used to form a battery pack. A pair of end plates are placed at two ends in the direction of alignment of the unit cells and the end plates are used to exert a restraining force on the plurality of unit cells (see Japanese Patent Application Publication No. 2006-253149 (JP-A-2006-253149), for example).

In the case of a structure, in which the end plates are in contact with the unit cells, however, there is a fear that the temperature of the unit cells that are in contact with the end plates becomes lower than the temperature of the other unit cells that are not in contact with the end plates because the heat of the unit cells is transferred to the end plates. In this case, the temperature varies depending on the plurality of unit cells that constitute the battery pack.

SUMMARY OF THE INVENTION

An electricity storage device according to an aspect of the invention includes: a plurality of cells that are aligned in a predetermined direction; a pair of end plates that sandwich the plurality of cells in the predetermined direction; and a restraining member that extends in the predetermined direction, is fixed to the pair of end plates, and exerts a restraining force on the plurality of cells in the predetermined direction via the end plates. Each of the end plates includes a first plate and a second plate. The first plate has a plurality of ribs on a surface that faces the adjacent cell and is formed of insulating material. The second plate is fixed to the first plate on a side opposite to the surface that faces the adjacent cell and is formed of material stronger than the insulating material for the first plate.

The first plate may be formed of resin and the second plate may be formed of metal. The first plate may have a fastening portion, formed in part of the plurality of ribs that are formed in the first plate, for fastening the restraining member. With this configuration, the external force exerted when the restraining member is fastened to the fastening portion is received by the ribs, so that it is possible to suppress deformation of the first plate.

The plurality of ribs may include at least a first rib that extends in a first direction in a plane orthogonal to the predetermined direction and a second rib that extends in a second direction different from the first direction in the plane, for example. When the ribs that extend in different directions are used, it is possible to suppress reduction in strength of the first plate even when the ribs are formed.

A surface of the first plate that is in contact with the second plate may be substantially flat. This makes it easy to attach the second plate to the first plate. A closed space may be formed on a surface of the cell that is adjacent to the first plate with the use of the ribs of the first plate. When the closed space is formed, flow of air between the closed space and the outside space is prevented. By keeping air in the closed space, it is possible to suppress the flow of heat of the cell to the first plate.

A separator plate may be placed between two of the cells that are adjacent to each other in the predetermined direction. The separator plate can be used to form a space, through which a heat exchange medium flows, on surfaces of the two of the cells. With this configuration, the heat exchange medium is brought into contact with the surfaces of the cells, so that it is possible to regulate the temperature of the cells.

According to the invention, it is possible to form an air layer on a surface of the cell by the ribs formed on the first plate, so that it is possible to inhibit the heat of the unit cell from being transferred to the first plate. Specifically, it is possible to reduce the area of the contact surface between the first plate and the cell to suppress the heat transfer through the contact surface.

In addition, the second plate is attached to the first plate, on which the ribs are formed, so that it is ensured that the end plate has a high strength. When the first plate alone is used as the end plate, the strength of the end plate is relatively low and therefore, when the second plate formed of material stronger than the material for the first plate is used, it is ensured that the end plate has a high strength.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

An embodiment of the invention will be described below.

Figure 1:
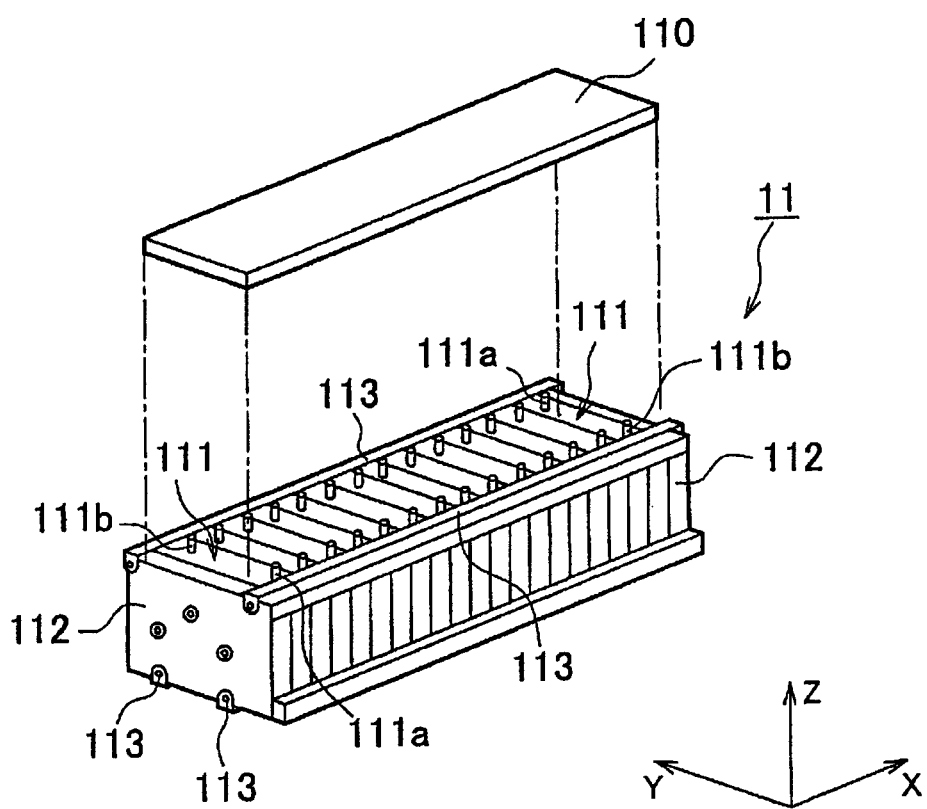
FIG. 1 is an external view of a battery pack.

A battery pack, serving as an electricity storage device, that is an embodiment of the invention will be described with reference to FIG. 1. FIG. 1 is an external view of the battery pack and the X, Y, and Z axes shown in FIG. 1 are orthogonal to each other.

The battery pack 11 of this embodiment can be mounted on a vehicle and examples of the vehicle include hybrid vehicles and pure electric vehicles. The hybrid vehicle is a vehicle equipped with an internal combustion engine or a fuel cell in addition to the battery pack 11 as the motive power source for driving the vehicle. The pure electric vehicle is a vehicle equipped with the battery pack 11 alone as the motive power source of the vehicle.

The battery pack 11 may be connected to a motor/generator (not shown), which receives the output from the battery pack 11 to generate the kinetic energy for driving the vehicle. The torque output from the motor/generator is transmitted to wheels via a power transmission mechanism.

A step-up circuit and an inverter may be placed between the battery pack 11 and the motor/generator. When the step-up circuit is placed, it is possible to step up, or boost, the output voltage of the battery pack 11. When the inverter is used, it is possible to convert the direct-current (DC) power output from the battery pack 11 to the alternating-current (AC) power, so that it is possible to use a three phase AC motor as the motor/generator. The motor/generator converts the kinetic energy produced during braking of the vehicle into electric energy and outputs the electric energy to the battery pack 11. The battery pack 11 stores the electric power supplied from the motor/generator.

The battery pack 11 has a plurality of unit cells 111, each of which serves as a cell, that are aligned in the X direction. A rectangular unit cell is used as the unit cell 111. The number of unit cells 111 constituting the battery pack 11 may be suitably set. For example, the number of unit cells 111 may be set based on the power required of the battery pack 11 and the power of each unit cell 111.

A secondary battery, such as a nickel-hydrogen battery or a lithium-ion battery, may be used as the unit cell 111. Instead of the secondary battery, an electric double layer capacitor (capacitor) may be used. While the plurality of unit cells 111 are aligned in the X direction in the battery pack 11 of this embodiment, the invention is not limited to this. Specifically, a configuration may be employed, in which a plurality of unit cells 111 are used to form a battery module and a plurality of the battery modules are aligned in the X direction.

An electricity generating element is housed in the unit cell 111. The electricity generating element is an element that can perform charging and discharging. The electricity generating element may include a cathode element, an anode element, and a separator including the electrolytic solution placed between the cathode element and the anode element, for example. The cathode element is obtained by forming a cathode active material layer on the surface of a current collector. The anode element is obtained by forming an anode active material layer on the surface of a current collector.

A cathode terminal 111a and an anode terminal 111b are provided on the upper side of the unit cell 111. The cathode terminal 111a is electrically connected to the cathode element of the electricity generating element. The anode terminal 111b is electrically connected to the anode element of the electricity generating element. Two adjacent unit cells 111 are electrically connected to each other via a bus bar. In this embodiment, all of the unit cells 111 are electrically connected in series. The battery pack 11 may include a unit cell 111 that is electrically connected in parallel.

In this embodiment, a bus bar module 110, into which a plurality of bus bars are integrated, is used. The bus bar module 110 is placed on the upper side of the battery pack 11. The bus bar module 110 has a plurality of bus bars and a holder that holds the bus bars. The holder is formed of insulating material, such as a resin.

Figure 2:
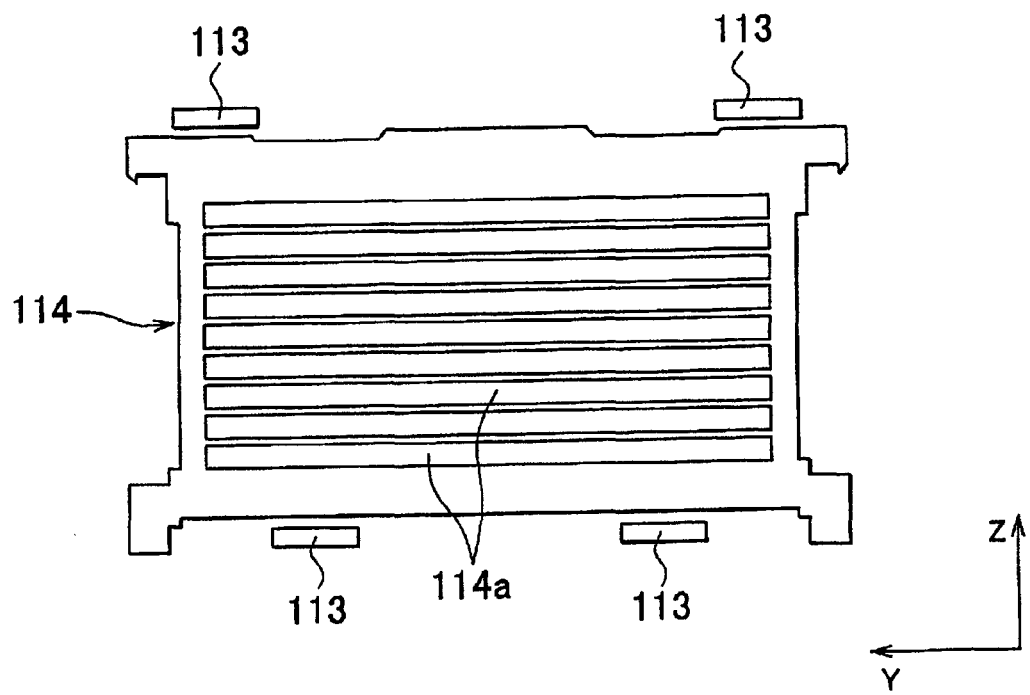
FIG. 2 is a front view of a separator plate.

A separator plate 114 shown in FIG. 2 is placed between two unit cells 111 that are adjacent to each other in the X direction. The separator plate 114 is formed of insulating material, such as a resin, and is used to form a space on each of the surfaces of the unit cells 111. This space serves as a space, through which a heat exchange medium for regulating the temperature of the unit cells 111 flows. The separator plate 114 has a plurality of protrusions 114a, the tips of which contact the unit cell 111, so that the space, through which the heat exchange medium flows, is formed on each of the surfaces of the unit cells 111.

In this embodiment, the protrusions 114a extend in the Y direction and the plurality of protrusions 114a are arranged side by side in the Z direction. Thus, the heat exchange medium flows along the protrusions 114a in the Y direction. The shape of the protrusion 114a is not limited to the shape shown in FIG. 2. Specifically, it suffices that a space, through which the heat exchange medium flows, is formed on each of the surfaces of the unit cells 111.

By causing the heat exchange medium to flow through the space formed by the protrusions 114a, the heat exchange medium is brought into contact with the unit cells 111, so that it is possible to regulate the temperature of the unit cells 111. When the unit cells 111 are generating heat, for example, by bringing a cooling heat-exchange medium into contact with the unit cells 111, the increase in temperature of the unit cells 111 is suppressed. On the other hand, when the unit cells 111 are overcooled, by bringing a heating heat-exchange medium into contact with the unit cells 111, it is possible to warm up the unit cells 111.

A pair of end plates 112 are placed at two ends of the battery pack 11. A restraining band 113, which serves as a restraining member, extends in the direction of alignment of the plurality of unit cells 111 and two end portions of the restraining band 113 are fixed to the pair of end plates 112. Two of the restraining bands 113 are placed on the upper side of the battery pack 11 and two of the restraining bands 113 are placed on the lower side of the battery pack 11.

When the restraining band 113 is fixed to the end plates 112, the pair of end plates 112 are displaced in the directions such that the pair of end plates 112 are brought closer to each other. In this way, a restraining force is exerted on the plurality of unit cells 111 that are sandwiched between the pair of end plates 112. The restraining force means the force, by which the unit cells 111 are vised in the X direction.

While the restraining band 113 of this embodiment is formed in a plate-like shape, the invention is not limited to this. Specifically, it suffices that the restraining band 113 is fixed to the pair of end plates 112 and can exert the restraining force on the unit cells 111. For example, instead of the restraining band 113, a restraining member that is formed in a cylindrical shape may be used.

Figure 3:
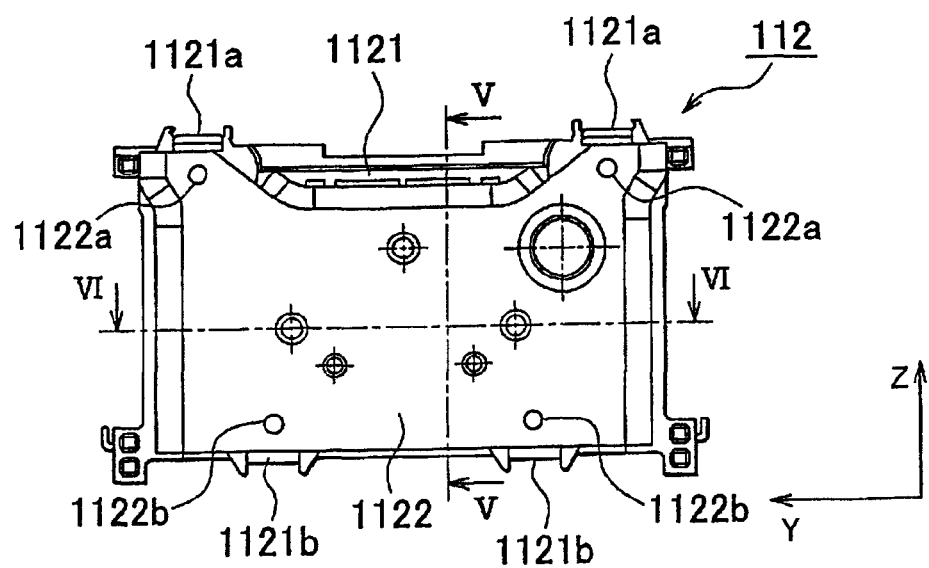
FIG. 3 shows an end plate that is viewed from the outer side.
Figure 4:
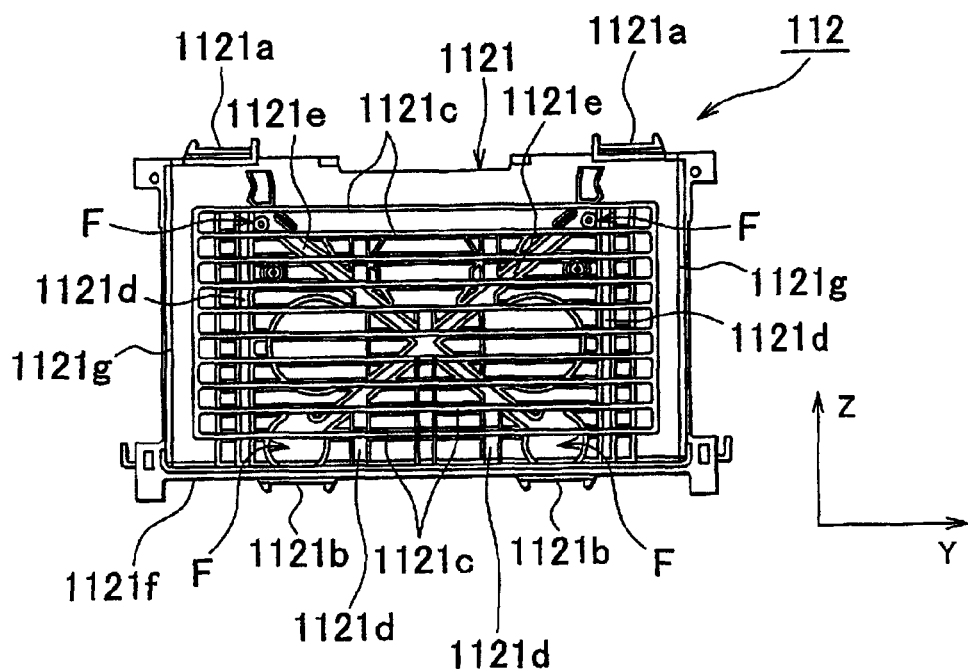
FIG. 4 shows the end plate that is viewed from the inner side.
Figure 5:
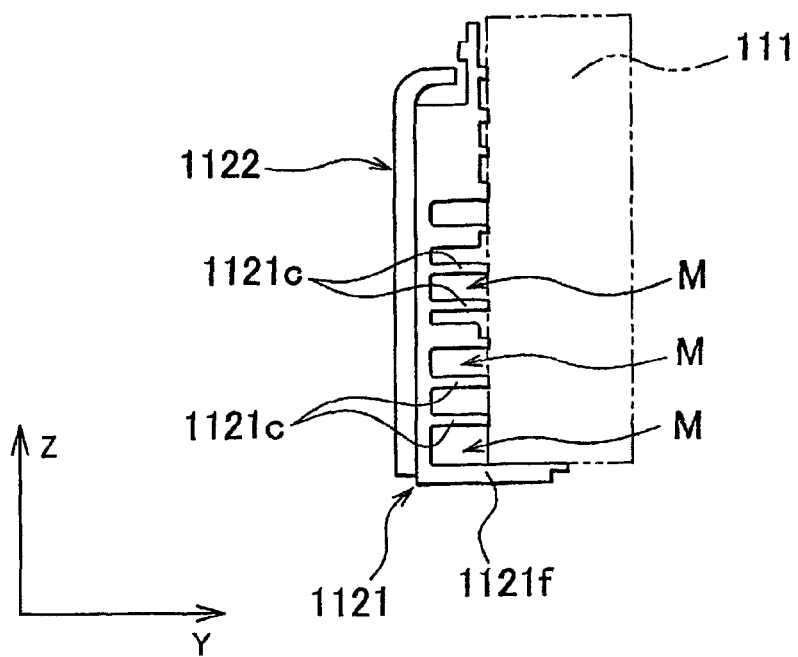
FIG. 5 is the cross section taken along the line V-V in FIG. 3.
Figure 6:
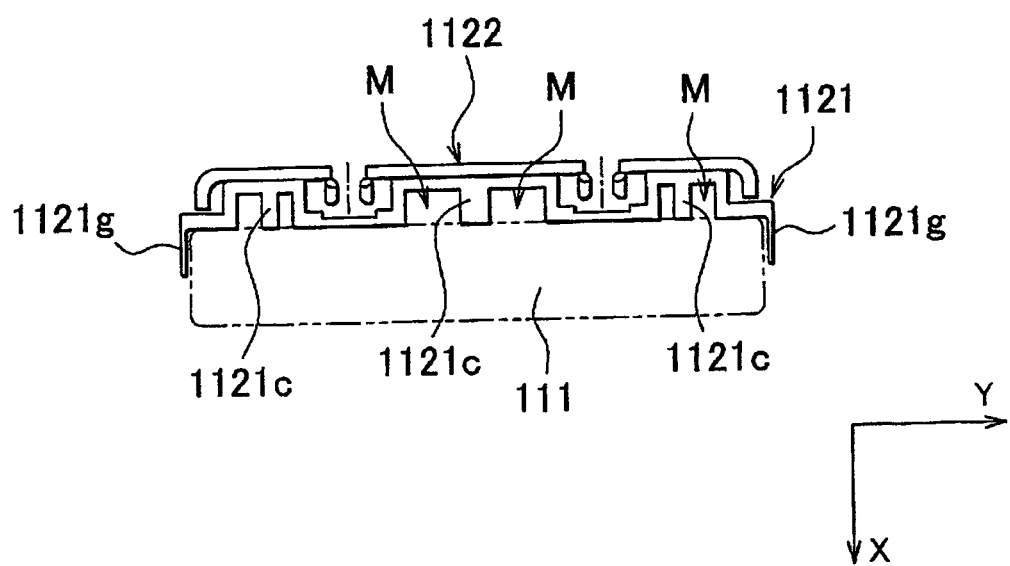
FIG. 6 is the cross section taken along the line VI-VI in FIG. 3.

The structure of the end plate 112 will be specifically described with reference to FIGS. 3 to 6. FIG. 3 shows the end plate 112 that is viewed from the outer side. FIG. 4 shows the end plate 112 that is viewed from the inner side (unit cell 111 side). FIGS. 5 and 6 are the cross section taken along the line V-V and the cross section taken along the line VI-VI, respectively, in FIG. 3.

The end plate 112 has a resin plate 1121, which serves as a first plate, and a metal plate 1122, which serves as a second plate. Guide portions 1121a, at each of which the restraining band 113 is fixed, are provided on the upper side of the resin plate 1121. Guide portions 1121b, at each of which the restraining band 113 is fixed, are provided on the lower side of the resin plate 1121.

As shown in FIG. 4, the resin plate 1121 has first ribs 1121c, second ribs 1121d, and third ribs 1121e on the surface (Y-Z plane) on the side, on which the resin plate 1121 contacts a unit cell 111. The first ribs 1121c extend in the Y direction and the plurality of first ribs 1121c are arranged side by side in the Z direction.

The tips of the first ribs 1121c are in contact with the unit cell 111. Thus, as shown in FIGS. 5 and 6, a plurality of air layers M are formed on the surface of the unit cell 111. The air layers M are spaces, each of which is surrounded by the resin plate 1121 and the unit cell 111. By forming the air layers M on the surface of the unit cell 111, it is possible to inhibit the heat of the unit cell 111 from being transferred to the end plate 112 (resin plate 1121).

The thermal conductivity of air is lower than the thermal conductivity of the resin plate 1121 and therefore, it is made difficult for the heat of the unit cell 111 to be transferred to the resin plate 1121. By making it less easy for the heat of the unit cell 111 to be transferred to the end plate 112, it is possible to suppress the reduction in temperature of the unit cell 111.

The air layer M may be a closed space. With this configuration, the flow of air between the air layer M and the outside of the end plate 112 is suppressed. If the air is kept in the air layer M, even when the heat of the unit cell 111 reaches the air layer M, escape of the heat from the air layer M is suppressed. The closed space herein does not necessarily mean the perfectly closed space and it suffices that the flow of air between the air layer M and the outside of the end plate 112 is suppressed.

The second ribs 1121d extend in the Z direction and intersect the first ribs 1121c. The plurality of second ribs 1121d are arranged side by side in the Y direction. The third ribs 1121e extend in directions (oblique directions) such that the third ribs 1121e intersect the first ribs 1121c and the second ribs 1121d. A fastening portion F for fastening the restraining band 113 is positioned at each of four end portions of the third ribs 1121e.

The second ribs 1121d and the third ribs 1121e that extend in the different directions are provided, so that it is possible to increase the strength of the resin plate 1121. In addition, because the third ribs 1121e are provided, it is possible to suppress deformation of the resin plate 1121 when the restraining band 113 is fastened to the resin plate 1121.

Meanwhile, as shown in FIG. 5, the resin plate 1121 has a protrusion 1121f that is in contact with the bottom of the unit cell 111. The protrusion 1121f protrudes more in the X direction than the rib 1121c does. As shown in FIG. 6, the resin plate 1121 has protrusions 1121g that are in contact with the sides of the unit battery 111. The protrusion 1121g protrudes more in the X direction than the rib 1121c does. The protrusions 1121f and 1121g are continuous with each other and are formed so as to extend along the periphery of the unit cell 111 when viewed along the X direction.

The metal plate 1122 is fixed to the resin plate 1121. One side of the resin plate 1121 is in contact with the unit cell 111 and the other side of the resin plate 1121 is in contact with the metal plate 1122. The side of the resin plate 1121 that is in contact with the metal plate 1122 is substantially flat. Thus, it is possible to easily attach the metal plate 1122 to the resin plate 1121.

The metal plate 1122 has holes 1122a and 1122b. The hole 1122a is for inserting a bolt therethrough and the bolt is used to fix the restraining band 113 to the end plate 112, the restraining band 113 being fixed at the guide portion 1121a. The hole 1122b is for inserting a bolt therethrough and the bolt is used to fix the restraining band 113 to the end plate 112, the restraining band 113 being fixed at the guide portion 1121b.

Forming the plurality of ribs 1121c in the resin plate 1121 can reduce the strength of the resin plate 1121. Thus, in this embodiment, the strength of the end plate 112 is secured by fixing the metal plate 1122 to the resin plate 1121. In addition, the metal plate 1122 has a flat surface, so that the restraining band 113 is easily attached thereto.

While the end plate 112 includes the resin plate 1121 and the metal plate 1122 in this embodiment, the invention is not limited to this. The end plate 112 may include a plate, corresponding to the resin plate 1121, that is formed of insulating material, and a plate, corresponding to the metal plate 1122, that is formed of material stronger than that for the former plate.

The invention has been described with reference to example embodiments for illustrative purposes only. It should be understood that the description is not intended to be exhaustive or to limit form of the invention and that the invention may be adapted for use in other systems and applications. The scope of the invention embraces various modifications and equivalent arrangements that may be conceived by one skilled in the art.

The invention claimed is:

1. An electricity storage device comprising:
   a plurality of cells that are aligned in a predetermined direction;
   a pair of end plates that sandwich the plurality of cells in the predetermined direction; and
   a restraining member that extends in the predetermined direction, is fixed to the pair of end plates, and exerts a restraining force on the plurality of cells in the predetermined direction via the end plates,
   wherein each of the end plates includes a first plate and a second plate, the first plate having a plurality of ribs on a surface that faces the adjacent cell and being formed of insulating material, the second plate being fixed to the first plate on a side opposite to the surface that faces the adjacent cell and being formed of material stronger than the insulating material for the first plate, and
   the ribs for a closed space on a surface of the cell that is adjacent to the first plate.

2. The electricity storage device according to claim 1, wherein the first plate is formed of resin and the second plate is formed of metal.

3. The electricity storage device according to claim 1, wherein the first plate has a fastening portion, formed in part of the plurality of ribs, for fastening the restraining member.

4. The electricity storage device according to claim 1, wherein the plurality of ribs include at least a first rib that extends in a first direction in a plane orthogonal to the predetermined direction and a second rib that extends in a second direction from the first direction in the plane.

5. The electricity storage device according to claim 1, wherein a surface of the first plate that is in contact with the second place is substantially flat.

6. The electricity storage device according to claim 1, further comprising a separator plate placed between two of the cells that are adjacent to each other in the predetermined direction and forming a space, through which a heat exchange medium flows, on surfaces of the two of the cells.

* * * * *